United States Patent
Taylor et al.

(10) Patent No.: US 9,201,606 B1
(45) Date of Patent: Dec. 1, 2015

(54) SYSTEM AND METHOD FOR AUTOMATING DATA MIGRATIONS BETWEEN HETEROGENEOUS ARCHITECTURES

(71) Applicants: Neal Taylor, Yorba Linda, CA (US); Peter Nickolov, Aliso Viejo, CA (US)

(72) Inventors: Neal Taylor, Yorba Linda, CA (US); Peter Nickolov, Aliso Viejo, CA (US)

(73) Assignee: CA, Inc., New York, NY (US)

( * ) Notice: Subject to any disclaimer, the term of this patent is extended or adjusted under 35 U.S.C. 154(b) by 212 days.

(21) Appl. No.: 13/897,847

(22) Filed: May 20, 2013

(51) Int. Cl.
G06F 3/06 (2006.01)

(52) U.S. Cl.
CPC ............ G06F 3/0647 (2013.01); G06F 3/0655 (2013.01); G06F 3/0661 (2013.01)

(58) Field of Classification Search
CPC .... G06F 3/0647; G06F 3/0661; G06F 3/0655
See application file for complete search history.

(56) References Cited

U.S. PATENT DOCUMENTS

| | | | |
|---|---|---|---|
| 7,290,003 B1 * | 10/2007 | Tong | 1/1 |
| 8,429,630 B2 | 4/2013 | Nickolov | |
| 8,595,452 B1 * | 11/2013 | Katzer et al. | 711/162 |
| 2014/0201146 A1 * | 7/2014 | Kapsiar et al. | 707/635 |

* cited by examiner

Primary Examiner — Aracelis Ruiz
(74) Attorney, Agent, or Firm — Baker Botts L.L.P.

(57) ABSTRACT

A method includes receiving a migration request to migrate a source data set stored at a source endpoint and having a first data format. The migration request includes a source identifier indicative of the source endpoint having a first architecture type and a destination identifier indicative of a destination endpoint having a second architecture type. The method also includes determining whether a data translation is required by comparing the first architecture type with the second architecture type. The method further includes determining a first particular transform mechanism from a plurality of transform mechanisms based on the second architecture type. The method additionally includes translating the first data format of the source data set into a second data format corresponding to the second architecture type using the first particular transform mechanism and storing the translated source data set at the destination endpoint.

27 Claims, 6 Drawing Sheets

SYSTEM AND METHOD FOR AUTOMATING DATA MIGRATIONS BETWEEN HETEROGENEOUS ARCHITECTURES

BACKGROUND

The disclosure relates generally to data migration, and more specifically to a system and method for automating data migrations between heterogeneous architectures.

SUMMARY

According to one embodiment of the disclosure, a method includes receiving a migration request to migrate a source data set stored at a source endpoint and having a first data format. The migration request includes a source identifier indicative of the source endpoint having a first architecture type. The migration request further includes a destination identifier indicative of a destination endpoint having a second architecture type, wherein the first data format is incompatible with the second architecture type. The method also includes, in response to receiving the migration request, determining whether a data translation is required by comparing the first architecture type with the second architecture type. The method further includes, in response to determining that the data translation is required, determining a first particular transform mechanism from a plurality of transform mechanisms based on the second architecture type. The method even further includes translating the first data format of the source data set into a second data format corresponding to the second architecture type using the first particular transform mechanism. The method additionally includes storing the translated source data set at the destination endpoint.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADED, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Data migration tools assist information technology (IT) managers in transferring data, systems, and applications between storage types, formats, or computer systems. Such data transfers sometimes include many manual, tedious operations that can tie up staff and system resources and cause confusion among employees and customers. For example, during a merger between two large organizations, management decides to combine the respective cloud-based systems of the merging entities. As another example, a legacy system is upgraded to a new platform to overcome deficiencies with the prior system. As yet another example, an organization undergoes a database migration in order to take advantage of new data types or faster query or data retrieval speeds on the new database platform. Data migrations occur in various contexts, including storage migration, database migration, application migration, web server migration, service migration, and business process migration.

Application migrations allow for development to take place on an x86 grid and the product to be ported to a System z (i.e., mainframe) virtual machine grid with no code changes. Some application properties and/or user data volumes may need to be changed out to match the production environment, but these modifications carry considerably less risk than code changes. Users may desire to migrate data to take advantage of available capacity, or decrease strain on an overworked server.

Some data migrations occur across homogeneous architectures. For example, a replica of an active business application is migrated to a backup or failover cluster system. In this example, the source and destination computing system architectures may be the same or similar, such as an INTEL® x86 architecture running WINDOWS® Server 2008. Such migrations include compatible data formats between source and destination systems.

However, when migrating data across heterogeneous system architectures, data migrations are more complex and problematic. Heterogeneous system architectures include computing platforms having varying instruction set architectures and/or varying memory architectures. For example, a mainframe system uses a big-endian multi-byte data type to describe the order in which a sequence of bytes is stored in its memory. In a big-endian system, the most significant value in the sequence is stored at the lowest storage address. Alternatively, x86 architectures use a little-endian system, where the least significant value in the sequence is stored first. Any data migration between heterogeneous file systems should account for the order in which each sequence of bytes is stored in the source and destination computer's memories.

For example, when migrating data between an INTEL® x86 architecture and an IBM® s390x architecture, data formatting and conversion should occur before the data and applications can be used on the target or destination architecture system. While data may be copied between heterogeneous systems, the transferred data must be transformed before the data is usable on the target system. Further, appropriate data transforms must be selected for each data type encountered on the source system. This selection must also correspond to the source architecture and data format, and destination architecture and data format. Often, a conversion environment will need to be established to perform the conversion without compromising the integrity of the source data. Such operations can tax both staff and resource consumption. These operations additionally take a long time to perform, at least in part due to the manual selection of data transformations, and other manual processes. Automating data transformations also takes a considerable amount of ramp-up time because of the migration, system, and site specific scripts that must be generated and tested in order to reliably automate even parts of the migration effort.

In accordance with certain embodiments of the present disclosure, a system for automating data migrations between heterogeneous system architectures is presented. The system may alleviate problems associated with migrating data between differing computer architectures. In certain embodiments, the system recognizes when a migration includes different architectures on source and destination systems, provides for automatic selection of the appropriate migrating tools, and invokes all the necessary migrations. Each of these steps may be performed without human intervention at the time that the migration is scheduled. The system may be implemented by creating an interface for automatically invoking the necessary transforms required to complete a specified data migration.

Figure 1:
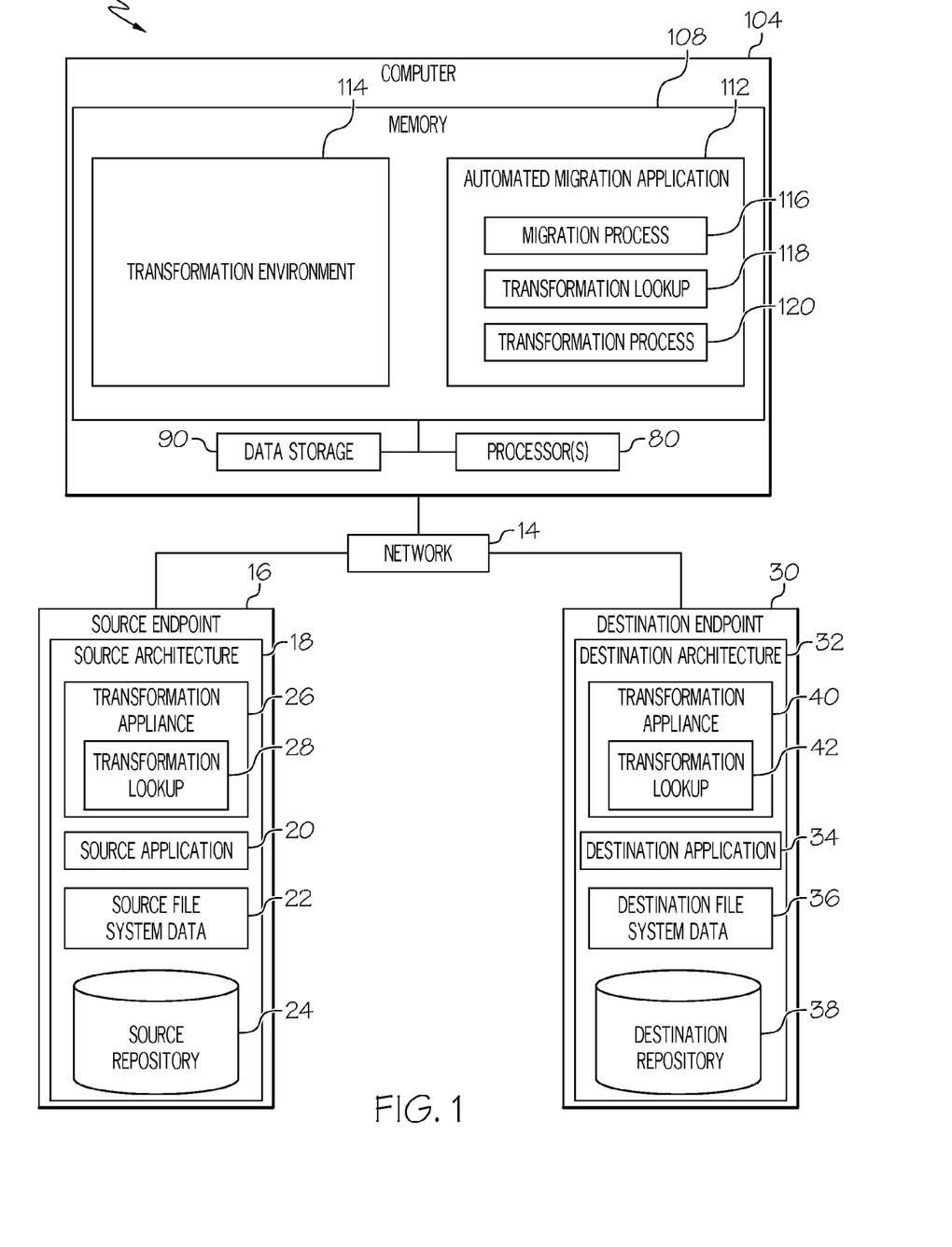
FIG. 1 illustrates a block diagram of a system for automating data migrations between heterogeneous architectures in accordance with a particular non-limiting embodiment of the present disclosure.

Referring to FIG. 1 a system 100 for automating data migrations between heterogeneous architectures is illustrated in accordance with a non-limiting embodiment of the present disclosure. System 100 includes a computer 104 with a memory 108 running an automated migration application 112. Computer 104 also includes a data storage 90 and processor(s) 80, and is connected to source endpoint 16 and destination endpoint 30 via network 14. In certain embodiments, computer 104, source endpoint 16, and destination endpoint 30 reside within a cloud environment, or a virtual computing grid. In certain embodiments, source endpoint 16 and destination endpoint 30 reside on separate computing grids. Source endpoint 16 includes a source application 20, source file system data 22, source repository 24, and transformation appliance 26, each running on a source architecture 18. Destination endpoint 30 includes a destination application 34, a destination file system data 36 a destination repository 38, and transformation appliance 40, each running on a destination architecture 32. Source architecture 18 and destination architecture 32 are incompatible heterogeneous computer architectures, such as, for example, x86 and s390x (e.g., System z or a mainframe). In certain embodiments, automated migration application 112 migrates data from source endpoint 16 to destination architecture 32 via network 14 by determining a data transform appropriate to transform data from the native data format on source architecture 18 to an equivalent data format on destination architecture 32.

For example, source endpoint 16 runs an x86 architecture platform as source architecture 18. Source endpoint 16 runs an application server running a web application as source application 20. File system data for source endpoint 16 is maintained as source file system data 22, and source endpoint 16 also hosts a MySQL® database as source repository 24. In this example, destination endpoint 30 includes a mainframe computing architecture as destination architecture 32. Automated migration application 112 migrates data from incompatible architectures on endpoints 16 to 30 by determining a transformation and automatically applying the proper transformation for each data type. In certain examples, the proper data transformation is automatically determined by migration process 116 based on transformation lookup 42, source architecture 18 and destination architecture 32. In certain embodiments, migration process 116 uses one or more of transformation lookup 28 and/or transformation 118 to determine the proper data transformation.

In the context of the present disclosure, certain terms may have specific definition within the context of virtualized data migrations in addition to a plain and ordinary meaning within the relevant art. For example, the term "application" sometimes includes a packaged structure of interconnected virtual appliances and user content configured to provide a specific business service. The term "application" may also denote its plain and ordinary meaning in the context of the relevant art. Usage of such terms in certain descriptions requires the more specialized definition, while the more general definition is appropriate for use in other descriptions within the present disclosure.

As another example, the term "assembly" sometimes includes a structure of interconnected virtual appliances and assemblies packaged together as a single compound virtual appliance capable of instantiation. The term "assembly" may additionally denote its plain and ordinary meaning within the context of the relevant art.

As yet another example, the term "filer" sometimes includes a virtual appliance that includes functionality for performing automated file-level and/or volume-level operations for a selected set of file systems.

The teachings of the present disclosure should be interpreted by one of ordinary skill in the art to enable storage of transformation lookup 42 on any system connected to network 14. For example, transformation lookup 42 may reside in memory 108 of computer 104, or source endpoint 16. In other embodiments, data transformations are determined by migration process 116 based on a transformation lookup on another system connected via network 14. In still other embodiments, a transformation lookup is located, for example, on a source appliance on source endpoint 16. In further embodiments, memory 108 of computer 104 contains an appliance with a transformation lookup.

In certain embodiments, migration process 116 scans transformation appliances available on destination endpoint 30, such as transformation appliance 40, for properties made available and/or published by each respective transformation appliance in order to determine which transformation appliance to utilize. For example, migration process 116 determines whether to use transformation appliance 40 by using properties published by transformation appliance 40 that indicate what architectures and data formats transformation appliance 40 is useful for.

Transformation appliance 40 may be arbitrarily complex (e.g., transformation appliance 40 may be an assembly). For example, transformation appliance 40 may represent a collection of appliances. The collection of appliances may include appliances running on source endpoint 16 (e.g., transformation appliance 26) and appliances running on memory 108 of computer 104.

In one example, migration process 116 receives a request to migrate source application 20 from source endpoint 16 to destination endpoint 30. Migration process 116 uses transformation appliance 26 to create an intermediate data format for any content and/or user data volumes attached to the source application 20 appliance. No executable binary code is migrated or transformed using this approach because an appliance class equivalent to source application 20 is available on destination endpoint 30.

Transformation appliance 26 determines which volumes relating to source application 20 are user and/or content volumes and which are application and/or appliance specific. Transformation appliance 20 transforms user and/or content volumes into an intermediate data format. Migration process 116 migrates the transformed intermediate format data to destination endpoint 30 transformation appliance 40.

Migration process 116 uses a catalog to find an appliance class matching the appliance class of source application 20. Migration process 116 instantiates the appliance class as destination application 34. Migration process 116 also determines the appropriate transformation appliance 40 based on the appliance class of source application 20.

Such a migration process may allow automation of the process (i.e., because the appliance the volume is attached to is known so a mechanism may be chosen automatically), and allow custom and 3rd party translation appliances to be built and/or provided by 3rd parties without requiring modifications or additions to existing translation maps.

Migration process 116 may determine which transformation appliance 40 to utilize by using a naming convention and/or by an explicit reference to the name of transformation appliance 40. For example, if the migrated data volume is attached to a MYSQL appliance, then a MYSQL_DMI translator is used. If the data volume is attached to an ORACLE appliance, then the ORACLE_DMI translator is used. If a translator is unavailable, or migrated data volume is generic text (e.g., if attached to a WEB-type appliance that uses portable content), filers copy the file by translating only the disk structure but not the file contents. In other examples, sets of data sets are transformed (i.e., sets of volumes). In still other embodiments, alternate volume sets are transformed.

As another example, migration process 116 receives a request to migrate source repository 24 to destination endpoint 30. In this example, transformation appliance 26 triggers a backup of source repository 24. The backup process results in a backup of some and/or all content of source repository 24. The backup may be in a text format. In this example, transformation appliance may not transform the text backup into an intermediate format because the text format is the intermediate format. The destination repository 38 may be equipped with a restore function that expects data in the text format. In certain embodiments, transformation appliance 26 may wrap text backup files into one or more, for example, tar file format files. Transformation appliance 40 may translate the tar package into the text backup file, instantiate destination repository 38 from the required appliance, and trigger a restore process on destination repository 38 using the backup text file.

In certain embodiments, automated migration application 112 creates a transformation environment 114 in memory 108 to assist in migrating and transforming the data between source endpoint 16 and destination endpoint 30. Transformation environment 114 may alternatively be created on one or more of source endpoint 16, destination endpoint 30, or at some other endpoint on network 14. Transformation environment provides a workspace for copying and transforming migrated data.

In certain embodiments, transformation environment 114 includes a transformation appliance with a transformation lookup. Migration process 116 may use transformation appliance 26, transformation appliance 40, or any other transformation appliance in system 100 connected to network 14 in migrating and transforming data across heterogeneous systems.

In certain embodiments, transformation environment 114 may be created on source endpoint 16, destination endpoint 30, or another memory space connected to computer 104 via network 14. In other embodiments, transformation environment 114 is created on both endpoint environments (i.e., source endpoint 16 and destination endpoint 30). In other embodiments, automated migration application 112 determines if transformation environment 114 is required, and where it should be created.

Heterogeneous file systems include computing platforms having one or more processors with varying instruction set architectures, and/or varying memory architectures. For example, a mainframe system uses a big-endian multi-byte data type to describe the order in which a sequence of bytes is stored in its memory. In a big-endian system, the most significant value in the sequence is stored at the lowest storage address. As another example, machines having an x86 architecture use a little-endian system. In these systems, the least significant value in the sequence is stored first. Any data migration between heterogeneous file systems should account for the order in which each sequence of bytes is stored in the source and destination computer's memories.

In another example, file system implementations on heterogeneous systems have different implementations. In yet another example, system architectures use different natural sizes for storing numbers. Data migration systems should also account for varying file system implementations and natural sizes for data types on respective architectures, among other architecture variances. The teachings of the present disclosure do not limit data transformations merely to overcoming the differences between architectures outlined in the present disclosure. Rather, data transforms accounting for any type of architecture discrepancy may be utilized without departing from the scope of the present disclosure.

The following example uses the components illustrated in system 100 to create another example embodiment of the present disclosure. In certain embodiments, computer 104 runs in a cloud computing system running on a grid of computers in a data center. Automated migration application 112 is called from various other system processes. Application migration application 112 receives a migration request from another system process connected to computer 104 via network 14. The migration request includes a source identifier with a source endpoint 16 having a first architecture type (i.e., source architecture 18) and a destination identifier with a destination endpoint 30 having a second architecture type (i.e., destination architecture 32). In this example, the source architecture type is x86 and the destination architecture type is System z. The calling system process intends to initiate a data migration from source endpoint 16 to destination endpoint 30.

As another example, destination endpoint 30 destination architecture 32 is an ARM processor architecture. In this example, source architecture 18 is an x86 architecture. Those of ordinary skill in the art should appreciate any combination of system architectures for any computing devices may be inserted as destination and source architectures 32 and 18 without departing from the scope of the present disclosure. Further, computer 104 may have any system architecture as well. Thus, the embodiments within the present disclosure may be architecture agnostic.

In response to receiving the migration request, automated migration application 112 launches migration process 116 to determine the data format corresponding to source application 20 based on the type of source architecture 18. For example, migration process 116 determines source application 20 is a web application server running on an x86 machine. In this example, source application 20 is running on a series of virtual machines hosted on an x86 based computing grid. For example, the grid may be running on a series of blade server, each server hosting multiple virtual machines. The virtual machines may be clustered together to provide the necessary resources for source application 20 while source application 20 is unaware of the actual physical server configuration it runs on. In this example, the data format of the source application 20 is incompatible with the second architecture type.

In certain embodiments, migration process 116 determines whether a data translation is required by comparing the data formats of source application 20 with compatible data formats on destination architecture 32. For example, migration process 116 determines whether source architecture 18 uses a big-endian system and destination architecture 32 uses a little-endian system. Migration process 116 determines other data format compatibilities and differences based on each computing architecture.

In response to determining that a data translation is required, migration process 116 uses transformation lookup 42 from transformation appliance 40 to determine a transform mechanism to apply to the source application 20 data. In this example, transformation appliance 40 corresponds to the appliance source application 20 is running on. Transformation appliance 40 may be used to transform data for use with destination application 34. Data transformations required for migrating user data on source application 20 to destination application 34 may be specified in transformation lookup 42. In other embodiments, migration process 116 uses transformation lookup 118 to determine a transform mechanism to apply to the source application 20 data. In some embodiments, migration process 116 uses transformation lookup 28 to determine a transformation mechanism. In still other embodiments, migration process 116 uses some combination of transformation lookup 118, 28, and 42, in determining the correct transform mechanism to apply to the source application 20 data.

A virtual appliance, such as transformation appliance 40 includes a virtual machine image designed to run on a virtualization platform, where installation of a software appliance on a virtual machine creates the virtual appliance. The virtual appliances may then be replicated, eliminating the need for installation other than specific implementation content data.

In certain embodiments, only the user content volumes of source application 20 are extracted and translated, while standardized appliance specific components are not transferred. For example, user content volumes contain web content such as web pages, html files, css files, script files, and other hosted web content. Settings and configuration files are also user content in certain embodiments. Appliance specific components relate to the application server generally and can be standardized across platforms without copying the underlying memory configuration of the application server.

For example, a JBOSS® application server configuration may be run on most systems running a Java Virtual Machine (JVM). However, copying a full configuration of a JBOSS® application server to another server will likely not result in an operational application server on the destination server. Installation of an application server requires many steps not performed by copying an existing application server configuration, such as system configuration steps, opening ports, obtaining permissions, and creating network and user accounts. Simply copying the configuration does not capture all these steps.

However, application specific components can be standardized across heterogeneous architectures such that adding an application server to a system is enabled through pre-configured virtual appliances. In certain embodiments, user content volumes are extracted and translated to the destination system architecture format. In this example, the underlying code of the source application server does not need to be copied to the destination system. In some embodiments, the application server is an appliance and is generated from a catalog of available appliances on both the source and destination systems. In this embodiment, the appliance code on the source is not copied to the destination system. Rather, a matching appliance is selected from a catalog on the destination.

In certain embodiments, transformation process 120 translates the data format of the source application 20 into an acceptable data format for the destination architecture. Transformation process 120 may create a transformation environment 114 to process the transform. For example, data from source endpoint 16 is copied to transformation environment 114. Transformations can be applied to the data, and output data is generated in transformation environment 114 before being copied to the destination architecture.

In certain embodiments, migration process 116 stores the translated data from translation environment 114 in destination endpoint 30. In these embodiments, data from source file system data 22 and source repository 24 may also be used without departing from the teachings of the present disclosure.

Certain embodiments of the present disclosure enable transferring volumes using incompatible partitioning schemes and file systems that encode their information differently between computing grids hosting virtual machines. For example, between an x86 and a System z (e.g., mainframe) system. Even in cases where file system disk structures are compatible between the grids, applications on the System z virtual machines are likely to store numeric information using a different encoding than virtual machines running on x86 grids. For example, when both grids run an ext3 file system, numeric information may still be stored using a different encoding.

Figure 2:
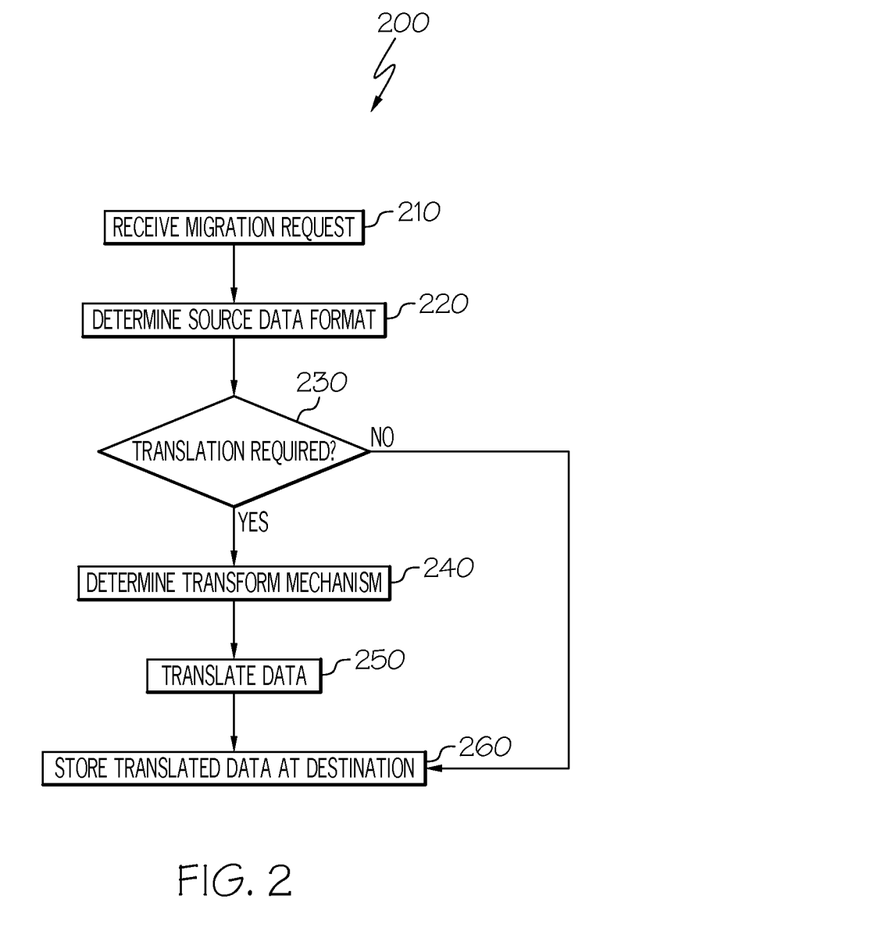
FIG. 2 illustrates a flowchart of a method for automating data migrations between heterogeneous architectures in accordance with a particular non-limiting embodiment of the present disclosure.

Referring to FIG. 2 a flowchart of a method 200 for automating data migrations between heterogeneous architectures is illustrated. For convenience, the components of system 100 are referenced when describing the features of method 200. At step 210 of method 200, a migration request is received by automated migration application 112 migration process 116. Using information relayed in the request, migration process 116 determines the source data format at step 220. For example, a source endpoint 16 and destination endpoint 30 identifier are relayed to migration process 116. Migration process 116 determines the format of the data requested for migration on source endpoint 16.

At step 230, migration process 116 determines whether a data translation is required for the requested data based on the compatibility of the format of the data on source endpoint 16 and the destination architecture 32.

At step 240, if migration process 116 determines a translation is required, migration process 116 uses transformation lookup 42 from transformation appliance 40 to determine the transform mechanism. In some embodiments, transform lookup information may reside on destination endpoint 30. In particular embodiments, transforms are attached to appliances available on destination endpoint 30. For example, web application server appliance 40 on destination endpoint 30 has transforms for all incompatible computing architectures. In these examples, migration process 116 contacts destination endpoint 30 to retrieve the transform mechanism matching the data format of source architecture 18. In other examples, transform lookup information may also be attached to appliances available on source endpoint 16, such as in transformation lookup 28.

In certain embodiments, migration process 116 at step 240 transforms content volumes into an intermediate data format. The intermediate data format may be more conducive to transformation on the destination. In other embodiments, the intermediate data format may be a standard file format such as tar and/or pipe.

At step 250, transformation process 120 translates the data from source application 20 using a transformation environment such as transformation environment 114. Migration process 116 loads the data output from the transformation process into destination endpoint 30.

Figure 3:
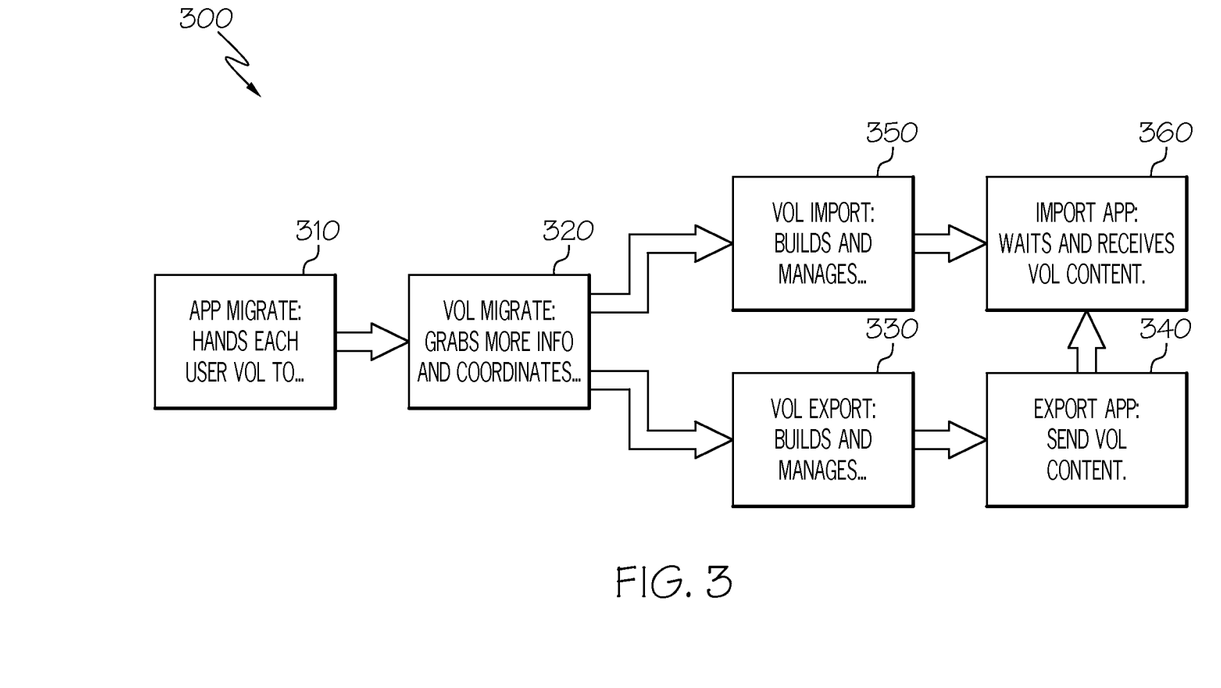
FIG. 3 illustrates a flowchart for migrating applications in accordance with a non-limiting embodiment of the present disclosure.

Referring to FIG. 3, a flowchart 300 for automating data migrations between heterogeneous architectures is illustrated in accordance with a non-limiting embodiment of the present disclosure. In certain embodiments, volume import and volume export processes connect to each other and pipe a volume between source and destination grids. This capability is used by a volume migrate capability 320 that coordinates the sequencing of volume importing and volume exporting as well as communicating volume attributes from the source side to the destination. The application migrate capability 310 then uses volume migrate capability 320 to move an application's user volumes during application migration. The volume export volume/import volume combination is able to create a blank volume, invoke filers to do a file system level copy of a volume, and invoke a custom assembly to do application specific transformations as a volume is migrated to the new grid. Process 350 builds and manages import of the volumes while process 330 builds and manages the export of the volumes. Process 340 sends the export volumes to the destination architecture where they are loaded into the import volumes by process 360.

Process 340 may translate the export volumes into an intermediate format. In certain embodiments, the intermediate format provides a common format for migrating volumes such that the destination only requires one appliance for each destination data format. This poses an advantage because if no intermediate data format is used, the destination may require transform appliances that match each possible source/destination format pairing.

For example, an application expecting "x" data format would require separate transformation appliances for each source data format "w", "y", and "z". Utilizing an intermediate data format may require only one transformation appliance (i.e., the appliance capable of transforming data from the intermediate data format to the destination data format).

As another example, for each architecture A, there can be an appliance P for each data type T. Each appliance P is capable of running in two modes: an export mode, in which it converts from the A architecture-specific data format to the intermediate (usually text or other portable format), and an import mode, in which it converts from the intermediate format to the architecture-specific format. Data transforms are effected by assembling an export-mode appliance from the source architecture with an import-mode appliance on the destination architecture. The data is piped in an intermediate format between the two appliances. Such appliances for each architecture can be made available for each data type (e.g., MySQL database, Oracle database, etc.).

Method 300 includes detection of two different architectures (e.g., within step 310 and/or 320), determination of the migrating assembly, creation of the volume, and moving the data.

In certain embodiments, application migrate is able to run from either grid. Once it establishes communication, it proceeds to do most of the work from the destination grid pulling the application to the new grid. In still other embodiments, the application migrate runs from a third grid and/or an independent computer system separate from either grid.

To detect if architectural processing is needed, when application migrate capability 310 or volume migrate capability 320 first establish communication with both grids, they acquire and examine grid properties from each grid and compare architectures (e.g., via the Available Architectures property). For example, for a mainframe, the architecture designation is "s390x". The architecture designation for an x86 grid is "x86".

In certain embodiments, a grid may contain servers that each has a different architecture. Architecture detection may require an argument to indicate the desire for architectural migration. Additionally, migration may happen either between grids or between servers within a single grid. Architectural migration could also happen automatically within a grid for scheduling purposes to allow appliances to run on a different server, should the appliance and application allow such.

When either application migrate or volume migrate recognizes the source and destination are, for example, s390x and x86 architectures, the processing detailed in the teachings of the present disclosure are invoked.

In certain embodiments, most user volumes will be sufficiently migrated by a file system level copy over the network to a volume newly created on the destination architecture. These cases included all text based systems such as web server definitions and/or other content files. These will be handled by adding a capability for piping data between two copies of filers running on their appropriate architectures.

In certain cases, data on the volume, such as page swap volumes or database log volumes for a currently coherent database, are not required. These volumes will be migrated by creating a new volume of the same size and file system type on the destination architecture while replicating labels as well. In certain embodiments, a file system level copy will be performed while the resulting volume contents are ignored by the receiving application.

Certain other cases include user volumes where data formats differ in the source and destination architectures. This is normally where the storage convention for numbers varies between the architectures. For example, one architecture uses big endian, while the other architecture uses little endian. As another example, the architectures use differing floating point formats. As still another example, applications implement differences in data storage to optimize performance on the native architecture. As yet another example, database storage formats vary between architectures to improve query and data retrieval speeds as well as storage space performance.

For such volumes, a separate assembly will be used to build a custom data migrating application which will be invoked, much like a filer, to transform and pipe the user volume data between grids. In certain embodiments, this assembly will consist of an appliance running an import or export mode and mounting the necessary user volumes.

Figure 4:
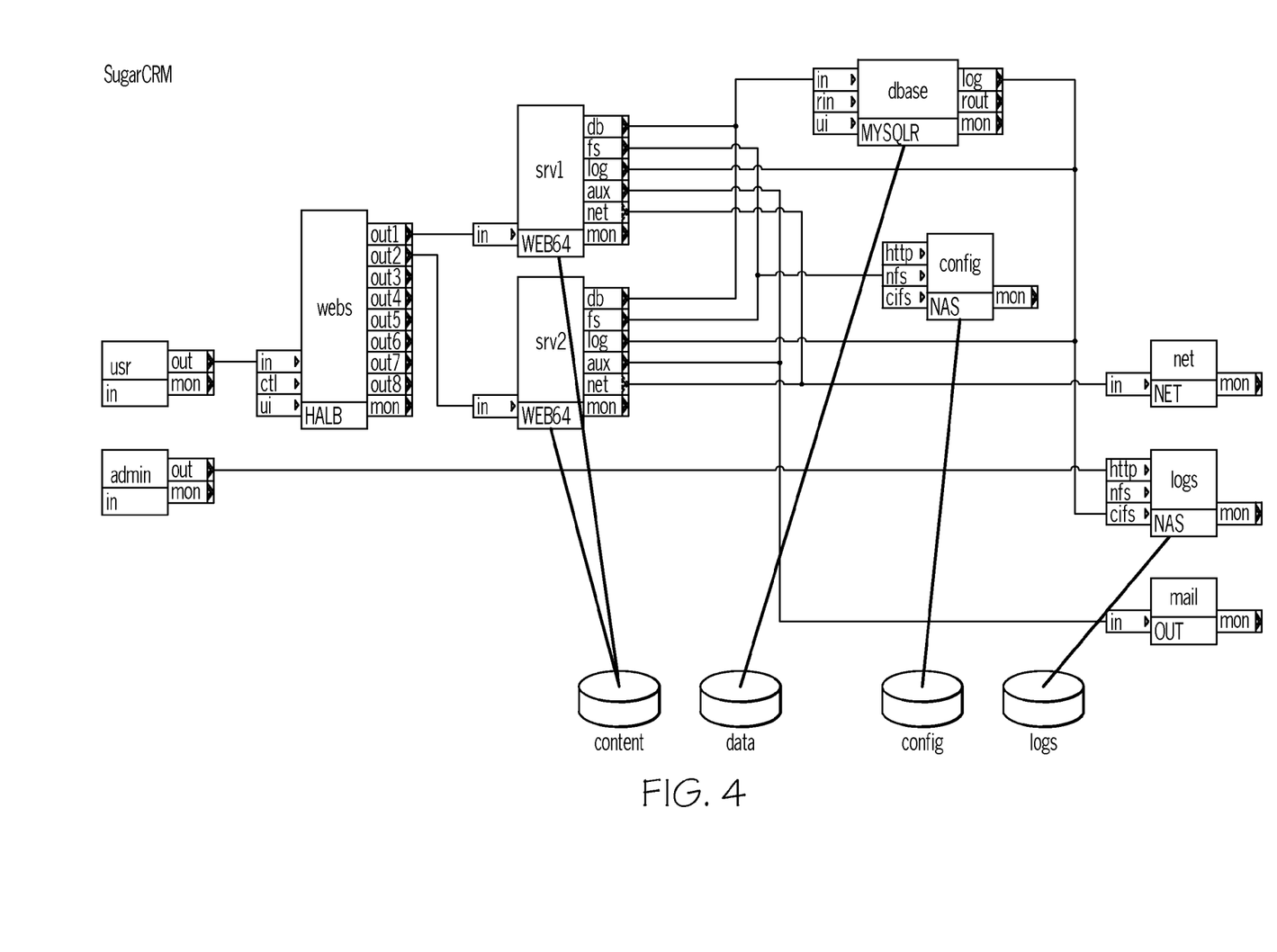
FIG. 4 illustrates a UML diagram of an example migration of a MySQL database running in a CRM application in accordance with a non-limiting embodiment of the present disclosure.
Figure 5:
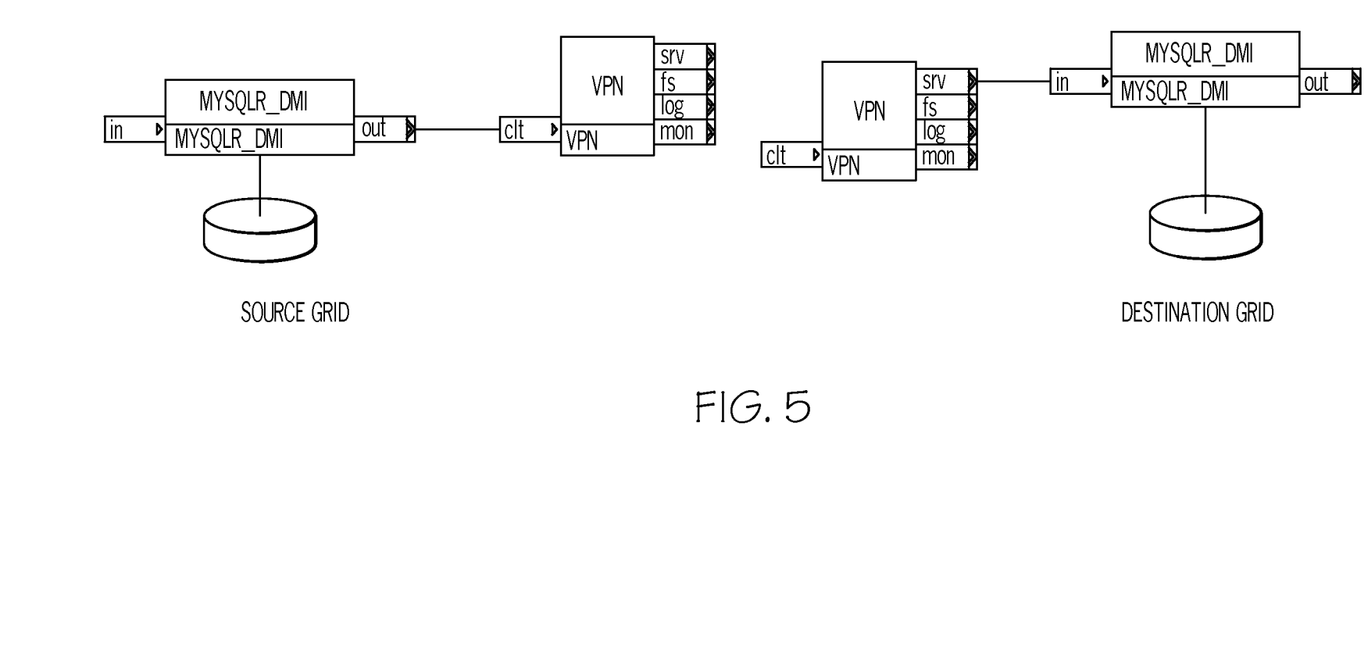
FIG. 5 illustrates a UML diagram of assemblies in migration applications in accordance with a particular non-limiting embodiment of the present disclosure.

Referring to FIG. 4, an example migration of a MySQL database running in a CRM application (i.e., SugarCRM) is illustrated. FIG. 5 displays a unified modeling language (UML) diagram of assemblies in a migration application is illustrated in accordance with a particular non-limiting embodiment of the present disclosure. FIGS. 4-5 are discussed together below.

Data migrate assemblies can be provided in a catalog with an appliance or may be overridden within an application. System 100 may search first in the application, and then in the catalog the appliance came from for the appropriate data migrate assembly. In certain embodiments, a simple naming convention is used to pair a data migrate assembly with its respective appliances. For example, an appliance's data migrate assembly could be searched for by appending "_DMI" to the appliance name, where "DMI" stands for data migrate interface.

In certain embodiments, once an entity moving the data between grids (i.e., the "migrator", which may be a "filer" or a data migrate assembly) has been located, migration process 116 proceeds to provide it and the volumes it wants moved to a volume migrate capability. The volume migrate gathers volume attributes and then invokes the volume import process to which it provides the gathered volume attributes. Volume import then creates the volume on the new architecture. Next volume export is invoked and cooperates with the volume import process that both builds and invokes their filers or their custom migrators as appropriate. The invoked pair of migrators then uses the supplied network connection (e.g., network 14) to move the volume's data between the copies running on the respective architectures applying any needed transformation.

In certain embodiments, the selected volumes are transformed into a portable format. The portable format may be conducive to transformation operations. For example, custom migrators may be used by vol import and vol export. The custom migrators may communicate by using a third data format that is incompatible with both source and destination systems and is usually a portable data format, such as text or an architecture independent binary format. This third data format may enable volume import to quickly and efficiently migrate the selected data volumes into the destination format.

Figure 6:
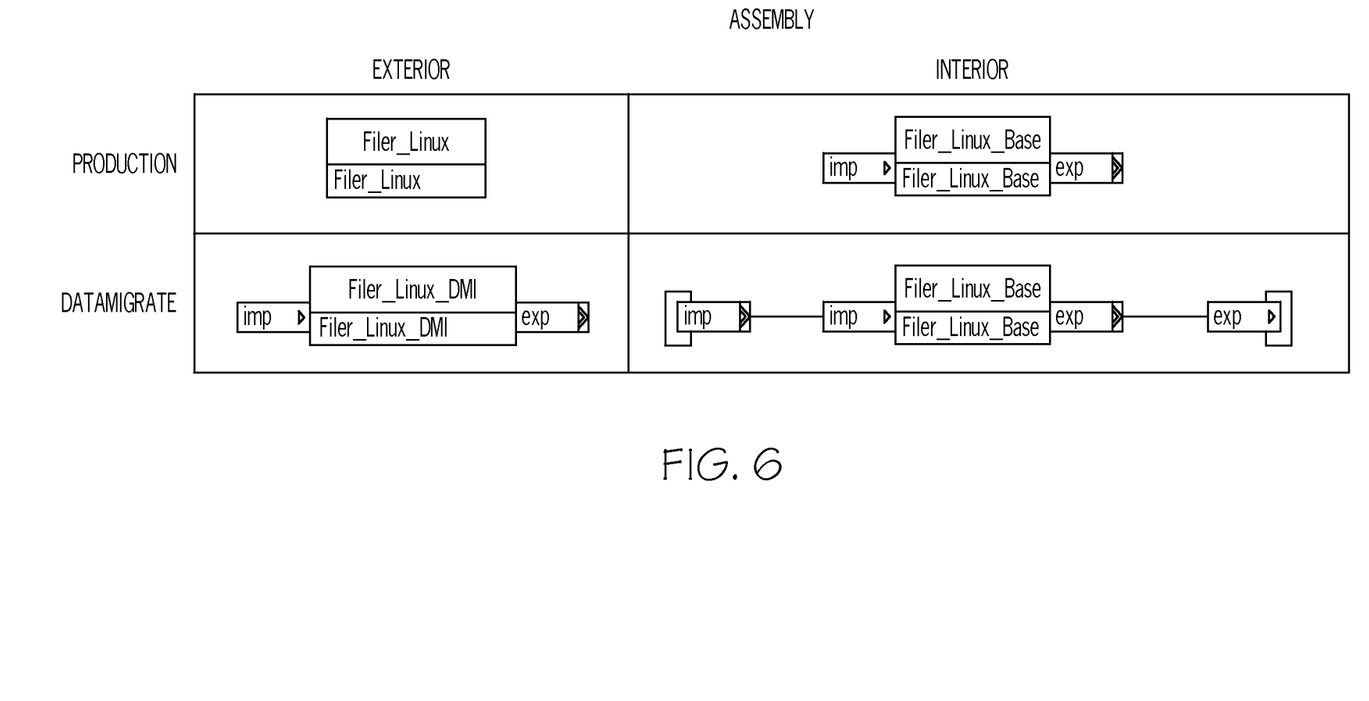
FIG. 6 illustrates an example implementation of assemblies used for data migration in accordance with a non-limiting embodiment of the present disclosure.

Referring to FIG. 6, an example implementation of assemblies used for data migration is illustrated in accordance with a non-limiting embodiment of the present disclosure. In certain embodiments, an appliance itself does not migrate to a new architecture. An appliance class may contain code compiled to run on a specific architecture. That code is sometimes incapable of booting and running on a different architecture. There may be architecture specific versions of the appliance class for each architecture thus allowing the appliance-specific code not to be ported or migrated for each migration and thus having only the data to be migrated in each instance. Additionally, the data may be stored in a separate user volumes. The application user volumes are moved to the new architecture.

An appliance may be modified to assist in migrating data to a new architecture so that volumes used by the appliance store data in architecture specific formats. This is usually numbers stored in binary form, either integer or floating point. If an exact copy of the appliance's files on the user volume can be successfully used on both architectures, then a custom data migrate appliance is not needed. Instead, the default file system level copy provided by the filer is both sufficient and easier for the appliance developer and application administrator.

The technical requirement for a custom data migrate appliance is that if the files created by the appliance running in the application cannot be read or used without change by the equivalent appliance on the other architecture, the appliance will need to implement a data migrate interface or provide some other process to transform the data as it's moved between architectures. The data migrate interface allows the necessary transform to automatically be run as a part of an application migration.

The data migrate interface may consist of terminals for import and export along with a property for indicating which mode of the appliance is being invoked. In some embodiments, the property for indicating which mode of the appliance is being invoked is optional and may not need to be set. For example, some appliances can determine the mode by examining which terminal is connected (e.g., import mode if the import terminal is connected). The import mode generally converts data from a portable format to an architecture specific format. Export generally converts data form an architecture-specific format into a portable format.

In some embodiments, the terminals and mode property will be added to the existing appliance and exposed through an assembly but it is legitimate to create an assembly using a completely different appliance or set of appliances. Best practice will be for the appliance to add the additional terminals and property but package that appliance in two assemblies.

For example, the "normal" assembly hides the data migrate terminals and property exposing only the normal interface for normal use while the data migrate assembly exposes only the data migrate interface.

The migrator assembly may contain more than one appliance. This allows handling of arbitrarily complex cases. For example, one likely case is where an appliance user volume is mounted via a network attached storage (NAS) device.

However the data migrate assembly is constructed, it should mount all user volumes the appliance does in the original application and it must take care of any migration required for all user volumes of that appliance in a single instantiation as exporter or importer.

An equivalent copy of the data migrate interface assembly may exist on each architecture involved in the migration. When invoked with a non-blank migrate mode property, the assembly may run in an application where the network path to the other copy is available on the appropriate import or export terminal. The "import" copy of the application will be invoked first and may wait for the "export" copy to connect before processing. The choice of protocol(s) between the data migrate assemblies is left up to the appliance designer.

In certain embodiments, a system for automating data migrations between heterogeneous architectures includes migrating applications between grids. If grids are of two different architectures, such as INTELO x86 and IBM® s390s, then nearly all non-text-only data may need to be translated in some manner before it is useful on the architecture of the destination grid. This translation usually involves considerable manual intervention and often requires tailoring to the specific case.

The system includes a mechanism for automatically invoking the correct translating mechanism for cross architecture translation of data without human intervention at the time of migration where each of the translations needed for a simple or complex multi-component application are invoked during the migration to a new architecture and the application successfully started at the destination. In certain embodiments, this is accomplished using an interface definition.

Around this interface, processing is arranged to recognize the migration endpoints that require data translation. For example, a request to migrate data is received. The request includes a source endpoint and a destination endpoint. The system determines the source and destination hardware architectures and determines whether a data migration is required.

The processing also recognizes that data requiring translating exists. For example, the system locates data sets, data blocks, repositories, applications, or other data resident on the source endpoint system. Using a predetermined set of data transformations, the system determines whether the architecture of the destination endpoint accepts or is compatible with the detected data formats.

The processing further recognizes the correct translation mechanism. For example, the system selects a transformation mechanism from a set of transformation mechanisms based on the appropriate destination data format.

The processing further creates the environment for transforming the data and invokes the correct transform mechanism. For example, a transformation environment is created such that the data transformations can safely be performed without degrading the source data. The transformation environment may be equipped with specific resources that are known to work more efficiently in a particular transformation process. After successful completion of the data migration process, the transformation environment is disposed of. For example, all resources of the transformation environment are released.

In certain embodiments, the above detailed process is repeated for each instance that requires data to be transformed. For example, a queue of data instances may be detected by the system and/or supplied by the user. Migration of each instance in the queue is completed before the next instance migration is undertaken. In certain embodiments, migration of multiple instances is simultaneously performed by different processes or threads of the system.

In certain embodiments, no human intervention is required at migration time. Additionally, the decision about the necessity for translation is removed from the cognizance of the human and is taken care of by the automation. For example, manual data transformation mappings are not required. Rather, the system for automating data migrations detects source data formats, and supported data formats on the destination system.

Those of ordinary skill in the art should recognize the teachings of the present disclosure to enable multiple computers, virtual machines, servers, data centers, or any other type of computing system to run program instructions that perform the steps disclosed in connection with the various embodiments presented.

The correct translation is automatically associated with a system component. For example, system components on the destination system may not work with data formats from the source. In these scenarios, a data translation is automatically associated with these system components.

In certain embodiments, all the migrations defined for migrating a simple or complex application are invoked by a single action or trigger. No additional migrations and/or transformations are invoked.

In these embodiments, the translations are typically accomplished faster than if human intervention is required.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    receiving a migration request to migrate a source application stored at a source endpoint, the source application comprising a plurality of related data volumes having a first data format, wherein the migration request comprises:
        a source identifier indicative of the source endpoint having a first architecture type; and
        a destination identifier indicative of a destination endpoint having a second architecture type, wherein the first data format is incompatible with the second architecture type;
    in response to receiving the migration request, determining whether a data translation is required by comparing the first architecture type with the second architecture type;
    in response to determining that the data translation is required, determining a first particular transform mechanism from a plurality of transform mechanisms based on the second architecture type;
    determining a set of user content volumes and a set of application specific volumes within the plurality of related data volumes at the source endpoint;
    translating the first data format of the set of user content volumes into a second data format corresponding to the second architecture type using the first particular transform mechanism;
    instantiating, at the destination endpoint, a destination appliance class equivalent to the source application to create a new set of application specific volumes in the second data format; and
    storing the translated set of user content volumes at the destination endpoint.

2. The method of claim 1, wherein translating the first data format of the set of user content volumes into the second data format comprises:
    translating the first data format of the set of user content volumes into an intermediate data format at the source endpoint; and
    translating the intermediate data format of the translated set of user content volumes into the second data format at the destination endpoint.

3. The method of claim 1, further comprising:
    initializing a translation environment;
    copying the set of user content volumes to the translation environment; and
    in response to storing the translated set of user content volumes, releasing resources consumed by the translation environment.

4. The method of claim 1, wherein each transform mechanism in the plurality of transform mechanisms corresponds to a respective appliance in a plurality of appliances at the destination endpoint.

5. The method of claim 1, further comprising:
    sending a backup request to a first component on the source endpoint, wherein the backup request results in generation of the set of user content volumes, and wherein the storing the translated set of user content volumes comprises restoring a second component on the destination endpoint with the translated set of user content volumes.

6. The method of claim 1, wherein the migration request further comprises a mapping that relates resources on the source endpoint to resources on the destination endpoint, and wherein the translated set of user content volumes is stored at the destination endpoint based on the mapping.

7. The method of claim 1, wherein determining the first particular transform mechanism is further based on the first data format and the second data format.

8. The method of claim 1, further comprising, in response to storing the translated set of user content volumes, starting an application at the destination endpoint, wherein the application is loaded in a memory of the destination endpoint, and wherein the application uses the translated data set.

9. The method of claim 1, wherein the first architecture type and the second architecture type are heterogeneous architecture types.

10. A computer configured to access a storage device, the computer comprising:
a processor; and
a non-transitory, computer-readable storage medium storing computer-readable instructions that when executed by the processor cause the computer to perform:
receiving a migration request to migrate a source application stored at a source endpoint, the source application comprising a plurality of related data volumes having a first data format, wherein the migration request comprises:
a source identifier indicative of the source endpoint having a first architecture type; and
a destination identifier indicative of a destination endpoint having a second architecture type, wherein the first data format is incompatible with the second architecture type;
in response to receiving the migration request, determining whether a data translation is required by comparing the first architecture type with the second architecture type;
in response to determining that the data translation is required, determining a first particular transform mechanism from a plurality of transform mechanisms based on the second architecture type;
determining a set of user content volumes and a set of application specific volumes within the plurality of related data volumes at the source endpoint;
translating the first data format of the set of user content volumes into a second data format corresponding to the second architecture type using the first particular transform mechanism;
instantiating, at the destination endpoint, a destination appliance class equivalent to the source application to create a new set of application specific volumes in the second data format; and
storing the translated set of user content volumes at the destination endpoint.

11. The computer of claim 10, wherein translating the first data format of the set of user content volumes into the second data format comprises:
translating the first data format of the set of user content volumes into an intermediate data format at the source endpoint; and
translating the intermediate data format of the translated set of user content volumes into the second data format at the destination endpoint.

12. The computer of claim 10, wherein the computer-readable instructions further cause the computer to perform:
initializing a translation environment;
copying the set of user content volumes to the translation environment; and
in response to storing the translated set of user content volumes, releasing resources consumed by the translation environment.

13. The computer of claim 10, wherein each transform mechanism in the plurality of transform mechanisms corresponds to a respective appliance in a plurality of appliances at the destination endpoint.

14. The computer of claim 10, wherein the computer-readable instructions further cause the computer to perform:
sending a backup request to a first component on the source endpoint, wherein the backup request results in generation of the set of user content volumes, and wherein the storing the translated set of user content volumes comprises restoring a second component on the destination endpoint with the translated set of user content volumes.

15. The computer of claim 10, wherein the migration request further comprises a mapping that relates resources on the source endpoint to resources on the destination endpoint, and wherein the translated set of user content volumes is stored at the destination endpoint based on the mapping.

16. The computer of claim 10, wherein determining the first particular transform mechanism is further based on the first data format and the second data format.

17. The computer of claim 10, wherein the computer-readable instructions further cause the computer to perform, in response to storing the translated set of user content volumes, starting an application at the destination endpoint, wherein the application is loaded in a memory of the destination endpoint, and wherein the application uses the translated data set.

18. The computer of claim 10, wherein the first architecture type and the second architecture type are heterogeneous architecture types.

19. A computer program product comprising:
a non-transitory computer-readable medium having computer-readable program code embodied therewith, the computer-readable program code comprising:
computer-readable program code configured to receive a migration request to migrate a source application stored at a source endpoint, the source application comprising a plurality of related data volumes having a first data format, wherein the migration request comprises:
a source identifier indicative of the source endpoint having a first architecture type; and
a destination identifier indicative of a destination endpoint having a second architecture type, wherein the first data format is incompatible with the second architecture type;
computer-readable program code configured to, in response to receiving the migration request, determine whether a data translation is required by comparing the first architecture type with the second architecture type;
computer-readable program code configured to, in response to determining that the data translation is required, determine a first particular transform mechanism from a plurality of transform mechanisms based on the second architecture type;
computer-readable program code configured to determine a set of user content volumes and a set of application specific volumes within the plurality of related data volumes at the source endpoint;
computer-readable program code configured to translate the first data format of the set of user content volumes into a second data format corresponding to the second architecture type using the first particular transform mechanism;
computer-readable program code configured to instantiate, at the destination endpoint, a destination appliance class equivalent to the source application to create a new set of application specific volumes in the second data format; and
computer-readable program code configured to store the translated set of user content volumes at the destination endpoint.

20. The computer program product of claim 19, wherein translating the first data format of the set of user content volumes into the second data format comprises:
translating the first data format of the set of user content volumes into an intermediate data format at the source endpoint; and translating the intermediate data format of the translated set of user content volumes into the second data format at the destination endpoint.

21. The computer program product of claim 19, wherein the computer-readable program code further comprises:
   computer-readable program code configured to initialize a translation environment;
   computer-readable program code configured to copy the set of user content volumes to the translation environment; and
   computer-readable program code configured to, in response to storing the translated set of user content volumes, release resources consumed by the translation environment.

22. The computer program product of claim 19, wherein each transform mechanism in the plurality of transform mechanisms corresponds to a respective appliance in a plurality of appliances at the destination endpoint.

23. The computer program product of claim 19, wherein the computer-readable program code further comprises:
   computer-readable program code configured to send a backup request to a first component on the source endpoint, wherein the backup request results in generation of the set of user content volumes, and wherein the storing the translated set of user content volumes comprises restoring a second component on the destination endpoint with the translated set of user content volumes.

24. The computer program product of claim 19, wherein the migration request further comprises a mapping that relates resources on the source endpoint to resources on the destination endpoint, and wherein the translated set of user content volumes is stored at the destination endpoint based on the mapping.

25. The computer program product of claim 19, wherein determining the first particular transform mechanism is further based on the first data format and the second data format.

26. The computer program product of claim 19, wherein the computer-readable program code further comprises computer-readable program code configured to, in response to storing the translated set of user content volumes, starting an application at the destination endpoint, wherein the application is loaded in a memory of the destination endpoint, and wherein the application uses the translated data set.

27. The computer program product of claim 19, wherein the first architecture type and the second architecture type are heterogeneous architecture types.

\* \* \* \* \*